(12) United States Patent
Fingerhut et al.

(10) Patent No.: US 7,089,003 B2
(45) Date of Patent: Aug. 8, 2006

(54) METHODS AND SYSTEMS FOR SELECTIVE BROADCAST ENHANCEMENT

(75) Inventors: Howard W. Fingerhut, Mendham, NJ (US); George She, Holmdel, NJ (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 685 days.

(21) Appl. No.: 09/921,272

(22) Filed: Aug. 1, 2001

(65) Prior Publication Data

US 2004/0171383 A1 Sep. 2, 2004

Related U.S. Application Data

(60) Provisional application No. 60/222,157, filed on Aug. 1, 2000.

(51) Int. Cl.
*H04Q 7/20* (2006.01)

(52) U.S. Cl. ............... 455/435.1; 455/450; 370/329

(58) Field of Classification Search ............ 455/435.1, 455/435.2, 436, 440, 442, 450; 370/331, 370/338, 329
See application file for complete search history.

(56) References Cited

U.S. PATENT DOCUMENTS

| | | | | |
|---|---|---|---|---|
| 4,856,083 A | * | 8/1989 | Makino | 455/166.2 |
| 5,465,388 A | * | 11/1995 | Zicker | 455/404.1 |
| 5,521,961 A | * | 5/1996 | Fletcher et al. | 455/444 |
| 5,652,572 A | * | 7/1997 | Kido et al. | 340/7.53 |
| 5,960,348 A | * | 9/1999 | Eisdorfer et al. | 455/445 |
| 6,058,311 A | * | 5/2000 | Tsukagoshi | 455/435.1 |
| 6,101,394 A | * | 8/2000 | Illidge | 455/466 |
| 6,393,298 B1 | * | 5/2002 | Fulton | 455/551 |
| 6,526,279 B1 | * | 2/2003 | Dent | 455/437 |
| 6,532,220 B1 | * | 3/2003 | Carneal et al. | 370/329 |
| 6,587,446 B1 | * | 7/2003 | Sarkar et al. | 370/331 |
| 6,591,100 B1 | * | 7/2003 | Dent | 455/434 |
| 6,668,955 B1 | * | 12/2003 | Kosakowski et al. | 180/68.4 |
| 6,741,872 B1 | * | 5/2004 | Pinault | 455/564 |

OTHER PUBLICATIONS

Author Unknown, "Nokia and Bluetooth—What Is Bluetooth", http://www.nokia.com/bluetooth/whatis.html, Jul. 31, 2001, p. 1.

Author Unknown, "Nokia and Bluetooth—Bluetooth in Action", http://www.nokia.com/bluetooth/inaction.html, Jul. 31, 2001, p. 1.

Author Unknown, "Nokia and Bluetooth—The Wireless Future", http://www.nokia.com/bluetooth/wireless.html, Jul. 31, 2001, p. 1.

(Continued)

*Primary Examiner*—Charles N Appiah
*Assistant Examiner*—Nghi H. Ly
(74) *Attorney, Agent, or Firm*—Walters & Zimmerman; Geoff Sutcliffe; Jennifer Pearson Medlin (57) ABSTRACT

Data is transmitted to and obtained by selected wireless devices in a wireless network without assignment of a unique network address (UNA) to the wireless devices. The data is transmitted over a broadcast and the wireless device obtains the data from the broadcast. Specifically, a wireless device is provisioned with a hardware serial number (HSN) and generic access numbers (GANs). The wireless device registers using the HSN and a randomly selected GAN. The service provider assigns and transmits a broadcast access number (BAN). The wireless device uses the BAN to access data from a broadcast from the service provider.

8 Claims, 7 Drawing Sheets

OTHER PUBLICATIONS

Author Unknown, "Nokia and Bluetooth—Bluetooth Visions", http://www.nokia.com/bluetooth/visions.html, Jul. 31, 2001, p. 1.

Author Unknown, "Nokia and Bluetooth—Supporting Bluetooth", http://www.nokia.com/bluetooth/supporting.html, Jul. 31, 2001, p. 1.

Author Unknown, "Nokia and Bluetooth User Applications", http://www.motorola.com/bluetooth/apps/apps.html, Jul. 31, 2001, pp. 1-3.

Author Unknown, "Motorola—Take Your World With You, Motorola and Bluetooth, The future is in your hands . . . , Bluetooth", date unknown, pp. 1-2.

Author Unknown, "Technology Overview", http://www.bluetooth.com/developer/specification overview. asp, Jul. 31, 2001, p. 1.

Author Unknown, "Ericsson Mobitex: About Mobitex", http://www.ericsson.com/wireless/products/mobsys/mobitex/about.shtml, Jul. 31, 2001, p. 1.

Author Unknown, "Ericsson—Ideal Network for Interactive Services", http://www.mobitex.webmaster.se/Mobitex_ny/Kampanj/zone1/5/main5b.as-p, Jul. 31, 2001, p. 1.

Author Unknown, "Ericsson—An Open International Packet Data Standard", http://www.mobitex.webmaster.se/Mobitex_ny/Kampanj/zone1/5/main5b_2.as-p, Jul. 31, 2001, p. 1.

Author Unknown, "Ericsson—An Open International Packet Data Standard", http://www.mobitex.webmaster.se/Mobitex_ny/Kampanj/zone1/5/main5b_2.asp, Jul. 31, 2001, p. 1.

Author Unknown, "Ericsson—Capacity That Not Even Flat Rate Pricing Will Overload", http://www.mobitex.webmaster.se/Mobitex_ny/Kampanj/zone1/5/main5b_3.asp, Jul. 31, 2001, p. 1.

Author Unknown, "Ericsson—Easy to Provide Network Coverage", http://www.mobitex.webmaster.se/Mobitex_ny/Kampanj/zone1/5/main5b_4.asp, Jul. 31, 2001, p. 1.

Author Unknown, "Ericsson—An Absolutely Reliable and Secure Technology", http://www.mobitex.webmaster.se/Mobitex_ny/Kampanj/zone1/5/main5b_5.asp, Jul. 31, 2001, p. 1.

Author Unknown, "Ericsson—Frequency Is Much Too Expensive to Waste", http://www.mobitex.webmaster.se/Mobitex_ny/Kampanj/zone1/5/main5b_6.asp, Jul. 31, 2001, p. 1.

Author Unknown, "Ericsson—Let the Kids Spend Money on Batteries",http://www.mobitex.webmaster.se/Mobitex_ny/Kampanj/zone1/5/main5b_7.asp, Jul. 31, 2001, p. 1.

Author Unknown, "Ericsson Mobitex: Contacts", http://www.ericsson.com/wirelesds/products/mobsys/mobitex/contacts.shtml, Jul. 31, 2001, p. 1.

* cited by examiner

METHODS AND SYSTEMS FOR SELECTIVE BROADCAST ENHANCEMENT

CROSS-REFERENCE TO RELATED APPLICATION

This application claims priority to and the benefit of the prior filed co-pending and commonly owned provisional patent application entitled "Selective Broadcast Enhancement", filed in the United States Patent and Trademark Office on Aug. 1, 2000, assigned Application No. 60/222,157, and incorporated herein by reference.

FIELD OF THE INVENTION

This application generally relates to communications, and particularly relates to the broadcast of data to wireless devices in a wireless network.

BACKGROUND

The term "wireless" is an old-fashioned word for the appliance we commonly today call the "radio". A radio was called a "wireless" because the signals received and broadcast by the radio were delivered without the use of wires. Today, the term "wireless" is still used in connection with communications devices. But today, the use of the term "wireless device" has expanded and may be used in connection with almost any device that receives data and/or voice communications without the use of wires such as through the use of a radio modem.

Wireless devices may include familiar personal communications devices such as mobile telephones, pagers, and personal digital assistants (PDAs). Wireless devices also may include less familiar data communications devices. These less familiar devices may be associated with terminal devices so as to bring communications features and functions to the terminal devices. The terminal devices may be fixed-site devices, so called because the devices are generally not mobile, but rather, fixed at a certain location. For example, a set-top box associated with a television may be considered a fixed-site device and may include a wireless device for receipt of data related to television programming or control.

Other examples of fixed-site devices that may have wireless devices include devices that make use of telemetry applications. These devices may include burglar/fire/emergency alarms, vending machines, utility or other meters, timers, clocking mechanisms, asset tracking systems, and other equipment. Additional examples of fixed-site devices that may have wireless devices include information systems or hubs and related elements that make use of the Bluetooth system. Information about the Bluetooth system may be obtained from the Bluetooth Special Interest Group (SIG) and the Bluetooth Web site: http://www.bluetooth.com. Further examples of fixed-site devices that may have wireless devices include Home RF devices and appliances. Advantageously, data may be sent over a wireless network to Home RF devices and appliances. The data may include warranty, diagnostic, service or other information. For brevity, a fixed-site device that is or may be associated with a wireless device is referred to herein as fixed-site wireless device.

Wireless devices, including fixed-site wireless devices, generally operate on a wireless network or system and are provided with services by one or more service providers. The network provider may also be, but does not have to be, a service provider.

An example of a well known wireless data communications network is the Mobitex network. The infrastructure of a basic Mobitex network typically includes a network control center (NCC), national switches, local switches, and base stations that communicate with wireless devices. The Mobitex network allows the wireless devices to communicate with other devices, elements, services, and platforms, and to communicate over other networks such as local area networks (LANs), wide area networks (WANs), other wireless networks, the public switched telecommunications network (PSTN), and the Internet. Additional information regarding the Mobitex network may be obtained from the Mobitex Interface Specification, Ericsson Mobile Data Design AB, Gothenburg, Sweden.

To facilitate communications, each wireless device may be assigned a unique network address (UNA) or other identifier. For example, a wireless device such as a mobile telephone may be assigned a mobile number as its UNA. To reach a person associated with the mobile telephone, a caller dials the mobile number. On the basis of the mobile number, the call is routed through the appropriate network(s) to the mobile telephone. In the Mobitex network, numbers may be assigned to wireless devices, and the numbers are referred to as Mobitex Access Numbers (MANs). The Mobitex network generally keeps track of the MANs and their respective wireless devices so that communications may be appropriately routed, subscribers may be properly billed, etc.

An advantage of the assignment of a UNA or other identifier to each wireless device in the network is that data or a communication may be directly and exclusively routed to that wireless device by using the UNA or other identifier as a type of address or locator. A disadvantage of the assignment is that the individual transmission of data to each of the wireless devices in the network may cause the network and radio channel to become over-utilized, thereby creating congestion and slow response in the system. Another disadvantage of the assignment is that the use of a large number of wireless devices may easily consume the limited number of UNAs or other identifiers set up for use by the wireless network or other entity. Consumption of all of the UNAs or other identifiers poses problems to the continuing operation and expansion of the wireless network.

As mentioned above, a wireless device may be a mobile device (such as a mobile telephone, pager, or PDA), or may be a fixed-site device (such as a set-top box, vending machine, emergency alarm, appliance or other). Besides their relative mobility or lack thereof, there is at least another typical difference between a "mobile" wireless device and a "fixed-site" wireless device. Generally, a fixed-site wireless device engages only infrequently in communications. For example, a set-top box may periodically receive data from a service provider such as a monthly update of television programming. Occasionally, the set-top box may initiate a communication with the service provider such as to pass on a request received from a user for a pay-per-view program. In contrast, the purpose of most mobile wireless devices is to facilitate regular, and sometimes continuous, communications.

The difference in the relative frequency of communications by fixed-site wireless devices versus mobile wireless devices has been noted and reviewed for purposes of improving and advancing wireless technology. In the review of the differences between the fixed-site vs. mobile wireless devices, the use and assignment of UNAs or other identifiers to wireless devices has come under scrutiny. As noted above, there are advantages and disadvantages to the assignment of UNAs or other identifiers to wireless devices.

Specifically, with respect to the Mobitex network, the problem of the assignment of UNAs or other identifiers has been noted and a different system has been proposed so that UNAs or other identifiers may be assigned to wireless devices in a controlled way, and so that, inter alia, UNAs and other identifiers may be reclaimed and recycled as necessary. This different system is referred to as the "wireless subscription management" (WSM) system (also referred to as the "wireless management" system.) As part of its review of assignment problems, the WSM system noted the infrequent communications of fixed-site wireless devices as compared to other wireless devices. This notice led, at least in part, to the invention of the WSM system regarding the assignment of MANs. The WSM system is based on the premise that the assignment of MANs to fixed-site wireless devices and associated record keeping activities constitute actions that are unnecessary. As a result of being unnecessary, the assignment and associated record keeping activities unnecessarily burden network infrastructure and resources by, inter alia, over-utilization of the network and radio channel, thereby creating congestion and slow responses in the network.

The WSM system has been developed to manage some aspects of MANs and wireless devices in the Mobitex and other networks. The WSM system and related systems and methods are described more fully in the following previously filed, and commonly owned patent applications, which are incorporated herein by reference:

Wireless Management System, U.S. Ser. No. 08/963,446, filed on Nov. 3, 1997.

Wireless Subscription Management with Dynamic Allocation of Unique Network Addresses, U.S. Ser. No. 09/722,316, filed on Nov. 28th, 2000.

Market Research Using Wireless Subscription Management, U.S. Ser. No. 09/749,836, filed on Dec. 28th, 2000.

Network Traffic Analyzer, U.S. Ser. No. 09/695,402, filed on Oct. 10, 2000, (inventors: Howard W. Fingerhut, Jeffrey D. Kashinsky, and Brian D. Kling).

Advantageously, the WSM system does not assign a unique number address (UNA) or MAN to a fixed-site wireless device. By avoiding such assignments, the WSM system avoids the pitfalls associated with the assignments and the associated record keeping activities. On the other hand, as a result of failing to assign a UNA or MAN to each fixed-site wireless device, the WSM system does not have information on the location of each of the fixed-site wireless devices in the system. In other words, the WSM system does not have an address for each of the devices. Without an address for a specific fixed-site wireless device, data or a communication cannot be routed directly to that specific device without other actions. The ability to pinpoint a specific device or a group including a small number of devices is lost without further measures being taken to locate the specific device or the group of devices.

As noted immediately above, the WSM system addresses the problem in the Mobitex (and similar networks) of the assignment of MANs and associated record keeping. Another solution to the assignment problem may be found within the Mobitex network. This other solution makes use of the inherent broadcast capabilities of the Mobitex network. The broadcast functionality of the Mobitex network can be used to send the same information from a number of base stations to multiple devices. The broadcast functionality of the Mobitex network generally matches the needs of the service providers providing the telemetry applications involving the fixed-site wireless devices. In these telemetry applications, generally, the same data is typically downloaded to the fixed-site wireless devices, and such download is relatively infrequent and generally does not have to be a real-time download or a critical download.

In the solution offered by the broadcast functionality of the Mobitex network, the fixed-site wireless device is not assigned a MAN or other unique network address (UNA). Without a MAN (or other UNA) assigned to a wireless device, the network is unaware of the location of the device. In effect, the network does not know the "address" of the wireless device at least for communications purposes.

The proposed broadcast solution has advantages. By the proposed solution, the data is delivered to the fixed-site wireless units. Also by the proposed solution, the record-keeping and other activities related to the assignment of MANs (or other unique network addresses) to fixed-site wireless devices are avoided. By avoiding the assignment of MANs, network infrastructure and other resources are conserved. In addition, over-utilization of the network and radio channel, congestion, and slow response of the system may be avoided.

But the proposed solution has disadvantages. One disadvantage is the limited geographical area of the broadcast. Another disadvantage is the administrative overhead and other problems that may be generated through the use of the broadcast feature. Both of these disadvantages are explained below. Yet another disadvantage, as mentioned above in connection with the WSM system, is the lack of an address or other identifier for a specific fixed-site wireless unit, which precludes direct and exclusive communication with that unit.

As noted, a disadvantage of the proposed solution of broadcasting the data to the fixed-site wireless devices is the limited geographical area that is reached by the broadcast. In the Mobitex network, for example, a broadcast can only be sent over a maximum of eight base stations. Data intended for fixed-site wireless devices distributed in a geographical area greater than served by the eight base stations can only be delivered through repeats (in groups of eight) of the broadcast over the appropriate base stations in the network.

Also as noted, another disadvantage is the administrative overhead and other problems that may be generated through the use of the broadcast feature. Even though some network infrastructure and other resources may be conserved by failing to assign unique MANs to fixed-site wireless devices, other network infrastructure and other resources may be wasted.

For example, in the Mobitex network, for a fixed-site wireless device to receive a broadcast, the device must be registered as a group subscription and must use a group MAN. Even though the assignment of unique MANs is avoided, the use of the Mobitex broadcast feature still requires assignment of at least group MANs and the associated record-keeping and other activities. A group subscription must be associated with a number of base stations (no more than eight), so the broadcast may be made from those predefined base stations.

Additionally, local switches (commonly referred to as MOXs) that have inferior connections to those predefined base stations must contain appropriate information such as information in their node databases. Any changes to the information, to the local switches, or the addition or deletion of local switches (and other elements) require synchronization of the appropriate data and elements between the local switches and the network such as synchronization with the network subscription database. The synchronization and related activities generate administrative overhead, and may lead to congestion and slow down in the network.

In sum, a wireless network is capable of delivering data to a fixed-site wireless device through use of a unique address or identifier of the device known as a UNA (or MAN in the Mobitex network). The assignment of UNAs and MANs to fixed-site wireless devices, however, is viewed as problematic and as burdensome to the wireless network.

The assignment problems have been addressed in proposed solutions. Yet, the proposed solutions have pitfalls. In proposed solutions that do not assign a UNA or a MAN to a fixed-site wireless device, the wireless network does not have address or other location information to route data and communications directly and exclusively to the device. In proposed solutions that use the broadcast functionality of a wide network, the limitations of the broadcast functionality provide other obstacles such as the limited geographical area served by the broadcast functionality and such as the assignment of group identifiers and other record keeping activities necessary to implement the broadcast functionality.

Accordingly, there is a need for methods and systems that address the disadvantages of the assignment of UNAs and MANs to fixed-site wireless devices in wireless networks by avoiding such assignment. There is a need for methods and systems that make use of the advantages presented by the broadcast functionality of wireless networks in delivering data and communications to fixed-site wireless devices without the need for assignment of UNAs and MANs. There is a need for methods and systems that make use of the advantages of the broadcast functionality of wireless networks to avoid the disadvantages and problems presented by that broadcast functionality.

Finally, the use of wireless devices and wireless technology is increasing. The methods and systems offered in response to the above-described problems must take into account this increase. The increase in wireless use may not allow for broadcast functionality of a wireless network to be implemented even in lulls in communications traffic. There may be problems posed by data or communications that are discarded or otherwise not delivered due to wireless traffic. Thus, there is a need for methods and systems that address the issues presented by increasing wireless use, and specifically the possibility of discarded or otherwise undelivered data.

SUMMARY

The inventions of this application operate in a wireless environment to efficiently distribute and deliver non-real-time, critical information (with "discard eligibility") in a broadcast fashion via selected (groups of) base stations. Advantageously, the inventions avoid the pitfalls posed by the assignments of UNAs and MANs to fixed-site wireless devices by generally not making such assignments. In addition, the inventions take advantage of the broadcast functionality of wireless networks. Yet, the inventions may be implemented without unnecessary broadcasting or over-broadcasting, which would burden network infrastructure and resources. Further, the inventions may include features that allow for transmission and exchange of data and communications to and with targeted fixed-site wireless devices. Also, the inventions may include features that increase the efficiency and efficacy of data transmission to fixed-site wireless devices by grooming such devices to receive or participate in communication exchanges on select frequencies or channels.

In addition, the inventions of this application may include embodiments that provide for interactive transaction-oriented or session-oriented information exchanges of a limited duration. During such interactive information exchanges, a "short-lived" unique access number (UAN) or unique Mobitex access number (UMAN) is assigned to a wireless device upon registration. At the end of the "short-lived" period, the UAN or UMAN is reclaimed, and may be recycled.

Stated generally, the inventions include exemplary embodiments that may operate as follows. A wireless device is provisioned with at least a hardware (or manufacturer's) serial number (HSN) and generic access numbers (GANs). At some point, the wireless device may be prompted to register with a service provider or other entity. The wireless device randomly selects a GAN to use in registration and transmits the GAN as well as its HSN to the service provider. The service provider assigns and transmits a broadcast access number (BAN) to the device. The device uses the BAN to access data from a broadcast from the service provider.

DETAILED DESCRIPTION

The inventions of this application operate in a wireless environment to efficiently distribute and deliver non-real-time, critical information (with "discard eligibility") in a broadcast fashion via selected (groups of) base stations. Advantageously, the inventions avoid the pitfalls posed by the assignments of UNAs and MANs to fixed-site wireless devices by generally not making such assignments. In addition, the inventions take advantage of the broadcast functionality of wireless networks. Yet, the inventions may be implemented without unnecessary broadcasting or over-broadcasting, which would burden network infrastructure and resources. Further, the inventions may include features that allow for transmission and exchange of data and communications to and with targeted fixed-site wireless devices. Also, the inventions may include features that increase the efficiency and efficacy of data transmission to fixed-site wireless devices by grooming such devices to receive or participate in communication exchanges on select frequencies or channels.

In addition, the inventions of this application may include embodiments that provide for interactive transaction-oriented or session-oriented information exchanges of a limited duration. During such interactive information exchanges, a "short-lived" unique access number (UAN) or unique Mobitex access number (UMAN) is assigned to a wireless device upon registration. At the end of the "short-lived" period, the UAN or UMAN is reclaimed, and may be recycled.

Stated generally, the inventions include exemplary embodiments that may operate as follows. A wireless device is provisioned with at least a hardware (or manufacturer's) serial number (HSN) and generic access numbers (GANs). At some point, the wireless device may be prompted to register with a service provider or other entity. The wireless device randomly selects a GAN to use in registration and transmits the GAN as well as its HSN to the service provider. The service provider assigns and transmits a broadcast access number (BAN) to the device. The device uses the BAN to access data from a broadcast from the service provider.

The inventions include other features and functions as described below in connection with the exemplary embodiments.

Figure 1:
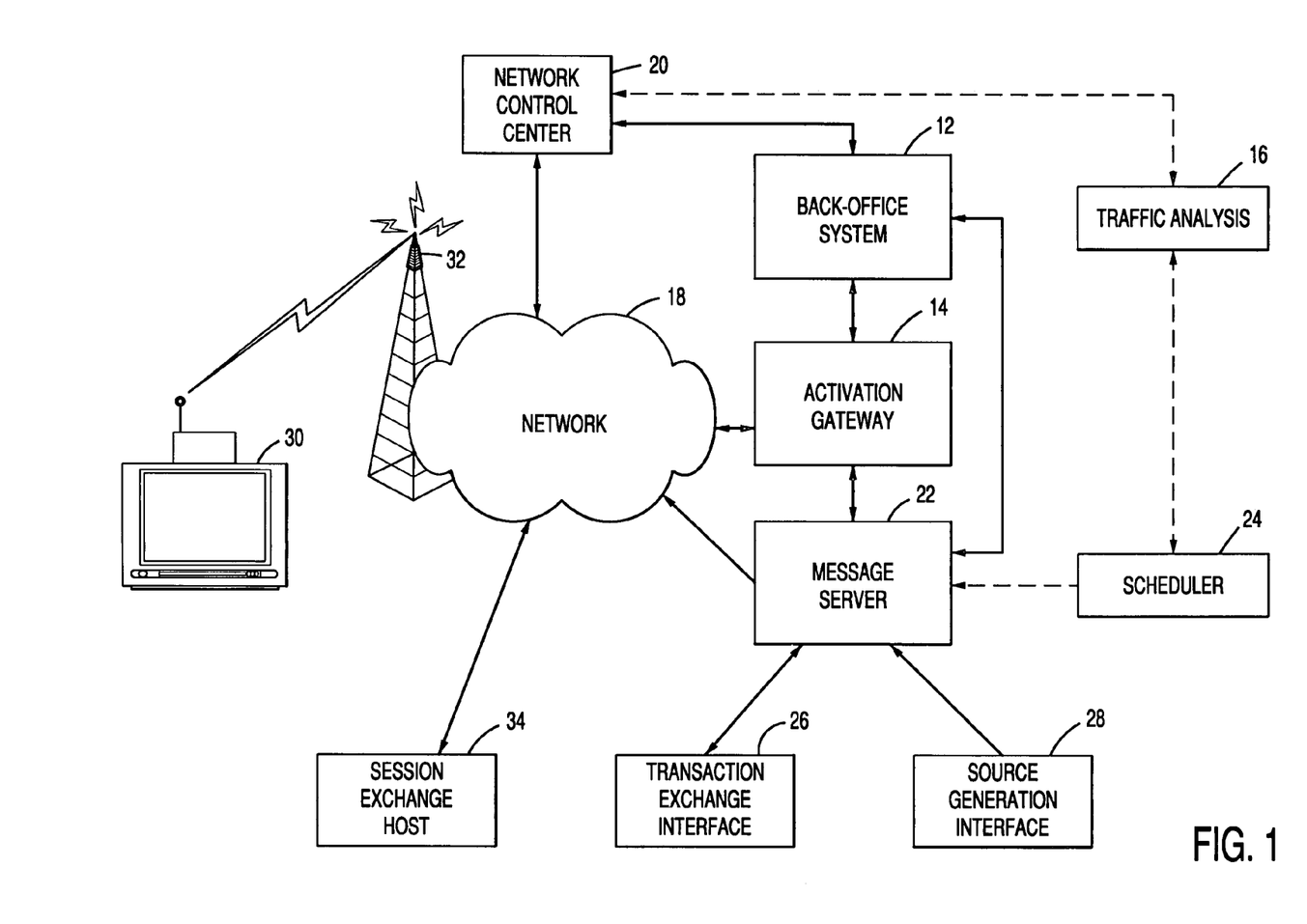
FIG. 1 illustrates an exemplary environment and exemplary architecture as may be used in implementing exemplary embodiments of the inventions.

An Exemplary Environment and Exemplary Architecture—FIG. 1

FIG. 1 illustrates an exemplary environment and exemplary architecture as may be used to facilitate the broadcast of information to select wireless devices.

The Back-Office System (BOS) 12 includes traditional features and functions useful and/or necessary to implementation of a wireless communications network such as traffic log collection, processing, and billing generation. The BOS includes interfaces or otherwise may interact with at least the following elements of the environment: the activation gateway 14, the network 18, the network control center 20, and the message server 22.

The activation gateway generally handles all communications between wireless devices through the network 18 and to the message server 22. For example, the activation gateway 14 includes features and functions to handle activation, deactivation and swap, and to support communication protocol with the message server 22. The activation gateway 14 supports the use of broadcast access numbers (BANs or BMANs). The activation gateway 14 also provides a node address of a base station to the message server 22 when appropriate such as in the case of the exchange and transmission of Activation Requests and/or Authorization Requests.

Further, the activation gateway 14 may be involved in transaction oriented and session oriented information exchanges as provided by some embodiments of the present inventions. For example, when a session oriented communication is needed between a wireless device and a service provider, then the activation gateway 14 handles the activation requests and authorization requests, if necessary, and assigns a short-lived unique access number (UAN) or unique Mobitex access number (UMAN). The activation gateway 14 may be able to deactivate and reclaim the short-lived UAN or UMAN.

Finally, the activation gateway 14 interfaces with or otherwise communicates with the back-office system 12, the network 18, and the message server 22.

The Traffic Analysis or Analyzer (TRANAL) 16 provides information on base station utilization (e.g. in histogram form) to the scheduler 24, and as appropriate, to the network control center 20. The utilization information is used so as to allow broadcasts to the wireless devices to be made during lull periods or non-busy times of the appropriate base stations. The TRANAL 16 may supply the utilization periodically or on request. Further, the TRANAL 16 may include features so as to be able to provide current or real-time information on utilization conditions and congestion state of the base stations, and specifically, the broadcast base stations.

The network 18 is a wireless data communications network that may have connections to other networks as well as the connections illustrated in FIG. 1. In the exemplary embodiments, the network 18 is a Mobitex network that has been enhanced to operate with the wireless subscription management (WSM) system. In addition, the Mobitex network may be enhanced so as to be capable of receiving messages (including broadcast messages) from elements in addition to the activation gateway 14. For example, the Mobitex network may be enhanced to receive broadcast messages from special network operator specified hosts.

The network 18 also may differ from other wireless networks with respect to the number of broadcasts or broadcast messages made pursuant to an ordinary group broadcast function and base station downlink retransmissions. A special MAX_REP parameter may be defined so as to be common to all broadcasts or broadcast messages. However, each broadcast may carry its own MAX_REP.

The message server 22 includes the functionalities of certain elements in the wireless subscriber management (WSM) system. For example, the message server 22 may include the functionality of the service assignment server (SAS) and the third-party authorization gateway (TAG) of the WSM system.

In addition, the message server 22 may include the following interfaces:

Interface with the activation gateway 14

Interface with the back-office system 12 at least for billing information

Interface with the scheduler 24 for scheduling the "time-to-broadcast" (and may include an alarm feed in case of network congestion)

Interface with a service provider's transaction exchange interface 26 or with the service provider's transaction exchange Interface with a service provider's source generation interface 28 or with the service provider's source generation (at least for instructions and messages from the service provider)

Interface with the network 18 using Network Gateway Interface (NGI) functions and operate as an NGI host with a direct connection to the network 18

In addition, the message server 22 processes service registration and re-registration requests (either randomly distributed, or for specific devices) from the wireless devices. In response to the requests, the message server 22 may be able to inform wireless devices whether broadcast services are available.

The message server 22 may maintain a database (not illustrated) to keep track of the use of broadcast access numbers (BAN) (BMANs in the Mobitex network). Each BAN or BMAN may include the following data structure: individual device identity (e.g., MSN, HSN and possibly UMAN); associated base station identification (ID); associated MAX_REP parameter; and associated service provider IDs.

The message server 22 may store other information in the database mentioned above or in a separate database. The other information may include geo-codes for base stations for use in the following situations. During service registration, a list of neighboring base stations, that might be used to carry broadcast information may be sent to a wireless device. Also, a service provider may instruct the message server to cause information to be broadcast in specific geo-coded areas.

Further, the message server 22 may maintain a log to keep track of the time and location of broadcast messages. A similar log may be maintained by the scheduler 24, and the two logs can be compared for audit or other purposes.

The message server 22 also may provide and/or support sequencing and transport mechanisms to ensure delivery of long messages. Of course, the message server 22 supports the broadcast protocol and processes as described herein including support of packet type messages.

In addition to causing the broadcast of messages with sequence numbers, the message server 22 may be capable of requesting packet receipt verification from specific wireless devices. The verification ensures the packets were broadcast. If the specified messages were not received, the message server 22 may cause the re-broadcast of the appropriate messages.

In some situations, the message server 22 may have the capability of disabling specific wireless devices. For example, the message server 22 can terminate services for subscriptions that are not met using the service in a manner it was intended to be used (i.e., causing congestion or unfair consumption of network resources). The message server 22 may be able to restart such disabled wireless devices.

The message server 22 is designed with redundancy and fail-over mechanisms. The message server 22 includes alert and maintenance capability. For example, when the message server 22 reaches full capacity or loses power, the message server 22 alerts or notifies operation personnel. Advantageously, the message server 22 has the capability of causing the broadcast of fleet re-registration requests. With this capability, the re-grooming of the fleet for traffic loading is possible.

The scheduler 24 determines when messages are to be broadcast. The scheduler 24 interfaces to the message server 22 and to the TRANAL 16. When the message server 22 has a message to broadcast to wireless devices on selective base stations, the message server 22 sends an inquiry to the scheduler 24 to determine the schedule for sending the message on the selected base stations. The scheduler 24 requests and receives traffic statistics on those selected base stations from TRANAL 16 such as in a histogram. By comparing the base station utilization through the data and transmission throughput (in packets per minute), the scheduler 24 determines when messages can be broadcast.

In addition, the scheduler 24 interacts with the TRANAL 16 or the network control center 20 to request and obtain continuous, near-real-time information on the current state of utilization and congestion of the broadcast base stations. If the information indicates that a base station or the network may experience congestion or resource over-utilization, the scheduler 24 may instruct the message server 22 to suspend message transmission.

The scheduler 24 may maintain a database (not illustrated) to keep track of when and where broadcast messages are sent. The information in the database may be compared to information stored elsewhere such as in a database in the message server 22.

Finally, the scheduler 24 is designed with redundancy and fail-over mechanisms. The scheduler also has alert and maintenance capability.

As noted above, the transaction exchange interface 26 interfaces the message server 22 with the transaction exchange (generally associated with a server of the service provider)(not illustrated). The interface 26 may include the functionality to process requests for transaction-oriented information exchange. Even though only one interface 26 is illustrated, others may be included and the others may connect to the same transaction exchange or different transaction exchanges.

Also as noted above, the source generation interface 28 interfaces the message server 22 with the source generation (generally associated with a server of the service provider) (not illustrated). The interface 28 may generate broadcast messages to all of the wireless devices in the fleet or one or more fleet members. The messages may contain the following information:

Message identification (MID)—coded with the serial number and current date information (the MID is reset to zero at the beginning of each day)

Broadcast geo code (BZC)—contains specific geo codes for desired broadcast areas Priority code—a priority code for a broadcast message may range from 0–255 where 255 represents the highest priority Discard eligible time (DET)—indicates the life of the message. The message time-to-live can be sent in one minute increments from five minutes to 65,535 minutes to enable scheduling within a 45.5 day window. If a message cannot be broadcast within the DET, then the message may be discarded and the source generation (service provider) is notified. The DET may be set to zero to indicate that the message cannot be retried. For example, if the first attempt to send a broadcast message fails (due to congestion or otherwise), then the message is discarded immediately. Transmission attempts may be made before the DET expires, as the conditions allow.

Status code—a message may have the following status: (1) outbound broadcast message (OBM); (2) outbound point-to-point message (OPM); (3) inbound point-to-point message (IPM); (4) outbound control message (OCM); (5) inbound control message (ICM); and (6) message discard notification (MDN).

Error code—a message may contain the following error code: (1) DET expiration; (2) system congestion ("system here includes the network 18, the activation gateway 14, and the message server 22); (3) system error; (4) billing error; and (5) subscriber unreachable.

Maximum retry—indicates the maximum number of transmission attempts to be made before the DET expires, as the conditions allow.

In addition, the interface 28 may receive a notification from the message server 22 indicating that specific messages have been discarded. The source generation determines whether or not the discarded messages should be transmitted.

The wireless device 30 in FIG. 1 is illustrated as a set-top box, but any wireless device such as described in the background may be included. The wireless device 30 generally must be able to handle activation, deactivation and swap. In addition, the wireless devices 30 may include the following capabilities:

Handling of broadcast and point-to-point message either individually or simultaneously Handling of different access numbers such as GANs, BMANs, and UMANs Handling of multiple BMANs for different broadcasting services Erasing of an UMAN when it expires Handling of service registration and re-registration Measuring of RSSIs of radio channels upon request Roaming to different radio channels upon request Handling of transaction-oriented information exchange Handling of session-oriented information exchange Handling of transport mechanism and reassembly of long messages Allow handling of personal and credit information In the inventions of this application, a wireless device 30 distinguishes between a broadcast message and a point-to-point message. In a broadcast message, the MSN/HSN field contains zero. If the MSN/HSN field of a message has a non-zero value, the wireless device 30 determines if the value matches its MSN/HSN. If the values match, the wireless device 30 treats the message as a point-to-point message. If the values do not match, the wireless device 30 ignores the message.

Further, a broadcast message may have data content that instructs the wireless device 30 to perform in a special way, which may include to establishing a point-to-point communication with some host or application server.

Element 32 in FIG. 1 represents a base station or other device that broadcasts the messages from the wireless network 18 to wireless devices such as device 30.

The session exchange host (SXH) 34 is a host server that connects to the network 18 in a conventional way (i.e., , X.25 or IP). The SXH allows the wireless device 30 to perform session-oriented information exchange. The wireless device 30 obtains a UMAN before the device initiates a session exchange. The network 18 uses a standard packet routing mechanism to route packets between the wireless device 30 and the SXH 34, as long as a correct UMAN and host MAN are used.

Figure 2:
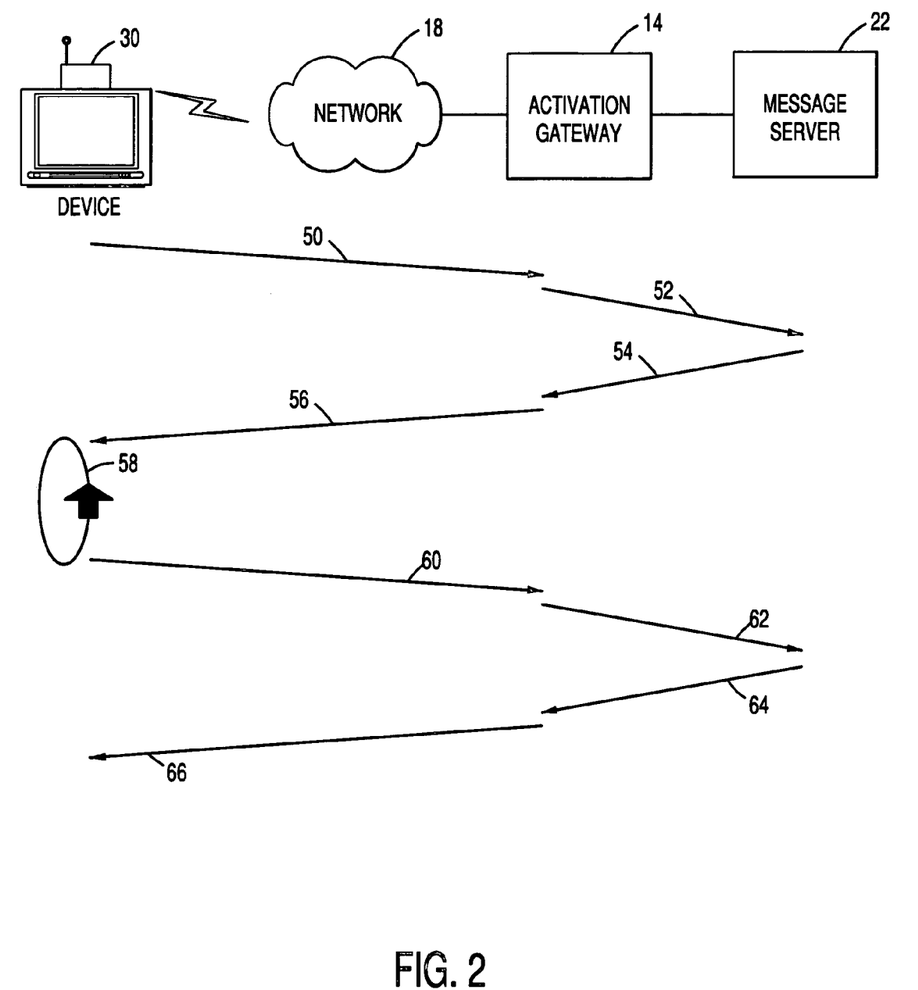
FIG. 2 illustrates an exemplary message flow during registration of a wireless device with a service provider or other entity.

Exemplary Registration of a Wireless Device—FIG. 2

FIG. 2 illustrates an exemplary message flow during registration of a wireless device 30 with a service provider or other entity. Generally, the wireless device 30 registers after it has been commissioned, or at other times, such as when prompted by the service provider or other entity. For example, see the discussion in the following section regarding service re-registration.

The wireless device 30 begins the registration process by sending a service registration (or activation) request. The service registration request includes the hardware serial number (HSN) (and/or the manufacturer's serial number (MSN) of the wireless device 30. The service registration request also includes a generic access number (GAN) randomly selected by the wireless device 30 from GANs provisioned in the device at time of manufacture or at other times. In the Mobitex network and the wireless subscription management (WSM) system, a special range of terminal Mobitex Access Numbers (MANs) 32–127 has been reserved for various purposes. For example, sixteen generic MANs 32–47 are used by the WSM system for over-the-air activation/deactivation. For selective broadcasting of information as implemented by exemplary embodiments of the inventions described in this application, sixteen Mans 112–127 are used as Broadcast MANs (BMANs) or Broadcast Access Numbers (BANs).

As indicated by arrow 50 in FIG. 2, the wireless device 30 transmits the service registration request through the network 18 to the activation gateway 14. As indicated by arrow 52, in response to the service registration request, the activation gateway 14 transmits an authorization request. In some embodiments, it may be necessary that the service registration request and/or the authorization request indicate whether the request is an initial or original request. The activation gateway 14 may provide an indication in the authorization request that the request is an initial or original request. The indication may be provided by inclusion of a selected value in a field of the authorization request or otherwise. For example, the value of a control code field may be set to a selected value to provide the indication.

In addition, the activation gateway 14 may include specific information related to the wireless unit 30 in the authorization request. The authorization request may include the node address of a base station serving the wireless unit making the request. The node address is supplied to the message server so the message server can update its records by associating the wireless device with the serving base station.

As indicated by arrow 52, the activation gateway 14 transmits the authorization request to the message server 22.

In some embodiments, it may be necessary that the service registration request or the authorization request be a "final" request prior to the message server 22 processing the registration of the wireless device 30. If the request is not "final", then the message server 22 may respond through the activation gateway 14 and the network 18 to the wireless device 30 as to bring about a final request by the wireless device 30. A final request relates to a wireless unit being served by a base station or radio channel operating in broadcast mode. The message server 22 may be provided with information (or otherwise obtain the information) as to whether or not the base station or radio channel is operating in broadcast mode, and/or as to whether the request is a final request. For example, the information about the finality of the request may be contained in a field such as the control code field of the authorization request. As another example, the message server may make a self-determination as to the finality of the request.

The following discussion relating to arrows 54, 56, 58, 60, and 62 describes the process when the base station or radio channel is NOT operating in broadcast mode (or if the authorization request otherwise is not final). If the base station or radio channel is operating in broadcast mode, then the process may skip so as to continue with the actions described below in association with arrow 64 and thereafter.

When the base station or radio channel is NOT operating in broadcast mode (or if the authorization request otherwise is not final), in response to receipt of the authorization request from the activation gateway 14, as indicated by arrow 54, the message server 22 sends an authorization denial to the activation gateway 14. The authorization denial may include reference to a "permanent denial". The authorization denial also may include reference to an available radio channel(s) to be used to obtain information broadcast in the serving area of the wireless unit 30.

Upon receiving the authorization denial, the activation gateway 14 reconciles the information into an activation response. In an embodiment, the activation response includes a field for inclusion of an activation result code. In the embodiment, the activation result code (octet 58) of the activation response contains "permanent denial" (value 2). As indicated by arrow 56, the activation gateway 14 transmits the activation response through the network 18 to the base station serving the wireless unit 30. The base station broadcasts the information from the activation response and includes the GMAN randomly selected by the wireless unit 30.

The wireless unit 30 responds to the broadcast by receiving the activation response. As indicated by arrow 58, the wireless unit 30 measures the signal strength of each of the radio channel(s) provided in the activation response. This measurement activity may take some time depending on the number of available channels. If a specific radio channel cannot be found, an RSSI of zero is recorded for that channel.

As indicated by arrow 60, when the wireless unit 30 has completed its measurements, the wireless device 30 sends a "final" activation request. The final activation request may include information on each available radio channel as measured by the wireless device 30, and the information may include an RSSI for each channel. The final activation request is transmitted to the activation gateway 14.

As indicated by arrow 62, the activation gateway 14 reconciles the information from the final activation request into a "final" authorization request. The activation gateway 14 forwards the final authorization request to the message server 22.

As indicated by arrow 64, when the message server 22 determines the authorization request is "final", then the message server 22 transmits a "final" authorization denial to the activation gateway 14. The final authorization denial may include reference to a "final" permanent denial. In addition, the final authorization denial may include a service information field. In the service information field, the following information may be included: (1) service status: either "service commissioned" or "service unavailable"; (2) radio channel (also referred to as base station channel number) or zero; and (3) broadcast access number (BAN) or no BAN.

If the service status is "service commissioned", then the radio channel included in the service information field is the radio channel broadcasting the information for the wireless device 30, and the BAN to be used by the wireless device 30 also is included.

If the service status is "service unavailable", then in place of a radio channel, a "zero" or other indicator may be included. Also, no BAN is included.

As indicated by arrow 66, the activation gateway 14 receives the final authorization denial and reconciles the information into a final activation response. The final activation response may include an activation result code (octet 58) including "permanent denial" (value 2). The activation gateway 14 transmits the final activation response to the base station serving the wireless unit 30. The base station broadcasts the final activation response and includes the GMAN randomly selected by the wireless unit 30.

The wireless unit 30 responds to the broadcast by receiving the final activation response. If the final activation response indicates a service status as "service commissioned", then the wireless device carries out the following actions: switches frequency (radio channel) to match the frequency (radio channel) provided in the final activation response; enters the broadcast mode; and programs the received BAN such as by including the BAN in its group list, which may contain up to seven group access numbers (GANs) and BANs.

If the final activation response indicates a service status as "service unavailable", then the wireless device 30 stays on its current radio channel and in the activation mode. The wireless device 30 waits for further instructions from the message server 22 such as may be provided in the case of service re-registration (discussed below).

The wireless unit 30 should not roam to a broadcast channel for two-way communications. The broadcast channel may not have a corresponding receive channel or may not be link balanced for data transmission.

Service Re-Registration

Once a wireless unit is registered, it may be required to re-register. The re-registration process follows generally the registration process described above in connection with FIG. 2.

But once a wireless unit is registered, it does not seem like a unit should have to re-register. Nonetheless, re-registration of a wireless unit (through a message server) with a service provider or other entity may be advantageous for many reasons. For example, a broadcast service may become available or may become stronger in an area where the wireless device is located. Either of these conditions may occur if the number of wireless devices in the area desiring to receive broadcast information reaches a pre-defined threshold, and the decision is made to make the service available or to increase its strength such as by a dedicated high power broadcast to the area. As another example, a wireless device may be required to re-register if the service provider or the message server needs to send a point-to-point message(s) to the wireless unit. As yet another example, a wireless device may be required to re-register if there is reason for an activity or renewal ping.

Service re-registration can be directed to wireless units on a random basis or to specific wireless units. The message server (or other entity) may select at random a group of wireless devices and send an Information Broadcast. The Information Broadcast contains the service re-registration control code.

With respect to re-registration of specific wireless units, the message service (or other entity) may effectively send a re-registration instruction or message to the specific devices by including identifiers for the specific units in the instruction or message. The identifiers may include the manufacturer's serial numbers or hardware serial numbers of the specific units. An advantageous use of the re-registration function may be made with respect to issues relating to renewal or continuance of service to a wireless device.

Figure 3:
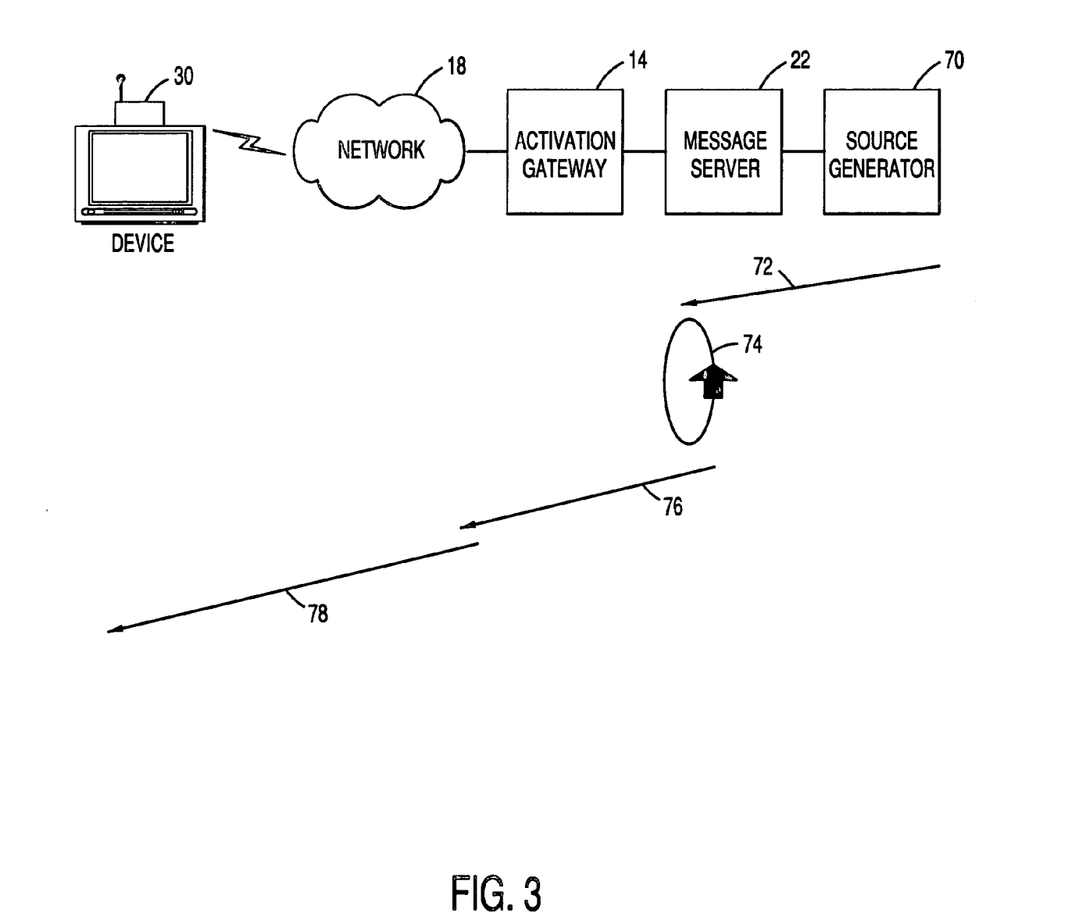
FIG. 3 illustrates an example of message flow for an exemplary information broadcast.

Information Broadcast—FIG. 3

Advantageously, the present inventions allow for the efficient delivery of information in a broadcast fashion to selected wireless devices. Given the low priority of the broadcast information with respect to other communications in a wireless network, the broadcast typically is conducted during non-busy periods such as at night. By broadcasting during non-busy or lull periods, several goals may be achieved. Such broadcasting during lull periods keeps traffic loading on the base stations balanced. Also, such broadcasting can generate additional revenue through use of base stations during generally under-utilized periods.

Even though the broadcast of information generally is to take place during non-busy or lull periods, the present inventions allow for the broadcast of information when a service provider or other entity may need the information broadcast. For example, a service provider may need to have information broadcast as soon as network resources permit. Thus, a SEND_NOW instruction may be included as appropriate. Further, even though a service provider may need information to be broadcast as soon as network resources permit, circumstances may dictate that the information is discarded or other not delivered. Some embodiments of the present inventions include a "discard eligibility" feature that relates to the possibility of discarding or other non-delivery of information. Per the discard eligibility feature, a broadcast may be discarded or otherwise not delivered based on priority of the broadcast with respect to other broadcasts, communications, etc. If the broadcast is discarded or otherwise not delivered, then the service provider is notified of the action.

Generally, information to be broadcast to a wireless device per the present inventions is broadcast through use of the fleet information broadcast (FIB) addressed to a broadcast access number (BAN). (A wireless device's acquisition of a BAN is described above in connection with FIG. 2.) The information directed to the wireless device also may be referred to as a payload message. Generally, the payload message is contained in designated fields. For example, the payload message may be contained in the service provider information field (octets 32–512). A long payload message may need to be divided into parts and each part sent separately. Thus, a sequencing mechanism for payload messages may be required. An exemplary sequencing mechanism is discussed below. Any device requiring the parts of the payload message must be able to reassemble the payload message per the appropriate sequencing mechanism.

An advantage of the present inventions is the conservation of network infrastructure and resources through use of only the minimally required elements. For example, the present inventions allow for the broadcast of information only on selected base stations or selected groups of base station. There are various factors that contribute to the selection of a base station(s) or group(s) of base stations for broadcasting of information. A factor in the selection of a base station may be the number of devices served by the base station and expecting to receive broadcasts. Another factor may be the traffic loading at a base station. A busy base station may be selected for broadcasting during lull periods such as at night. Yet another factor may be the relative power of a base station compared to others. A high power base station may be selected instead of a lower power base station so as to take into account wireless devices operating in the greater area served by the high power base station.

FIG. 3 illustrates an example of message flow for an exemplary information broadcast. Assume a service provider or other source desires to have information broadcast to wireless devices. The payload message for the broadcast may be generated at the service provider or source (collectively referred to as the "source generator" 70). The source generator 70 creates an information broadcast request (IBR), includes the payload message and appropriate control information in the IBR, and as indicated by arrow 72, transmits the IBR to the message server 22.

In response to receipt of the IBR, as indicated by arrow 74, the message server 22 consults with the scheduler (illustrated and discussed in connection with FIG. 1) with respect to the timing and other details related to the broadcast. The scheduler replies with instructions including information such as the times for broadcasts on specific base stations. The broadcast may be made according to the Broadcast Geo Code. Based on the instructions from the scheduler, the message service 22 arranges the information so specific broadcast times, base stations, channel numbers are appropriate for the broadcast. The message server 22 may use a fleet broadcast request (FBR) for the broadcast. The FBR may include the message identification, session counter, and other information. The message server 22 waits based on the instructions related to the timing and other details from the scheduler.

As indicated by arrow 76, at the appropriate time, the message server 22 transmits the FBR to the activation gateway 14. The activation gateway 14 reformats the payload message (with the message ID and session counter) into a Fleet Information Broadcast (FIB). The FIB is addressed to a broadcast access number (BAN). The activation gateway 22 then transmits the FIB through the network 18 to the base stations for broadcast. The FIB may be transmitted to specific base stations rather than all base stations. The base stations transmit the broadcast a number of times. (In some embodiments, the message server 22 may skip the transmission to the activation gateway 14 and transmit an appropriate FIB through the network 18 to the base stations serving the wireless devices).

An Exemplary Sequencing Mechanism

A long payload message may have to be divided, routed, and maybe even broadcast in parts. To handle such division and subsequent re-assembly, an exemplary sequencing mechanism is described.

As noted above, in the message flow related to the broadcast of information, a Fleet Information Broadcast (FIB) is created by the activation gateway 14 and transmitted through the network 18 to the base stations making the broadcast. The FIB includes a field referred to as the service provider information field. Data included in this field includes a three-byte "session counter". The session counter may include the following:

Two-byte secure number (in binary; 64 K, which can cover more than thirty-two Mbytes of information)

One-byte date counter (in binary), which may have the following format:

Bits 0–4: Represent the current calendar date (valid values from 1 to 31)

Bit 5: The MORE bit. Indicate if there are more packets to be received. At the beginning of a broadcast, this bit may be set to 1 if there are more packed to be received, or set to zero if there are no more packets to be received. The MORE bit is always set to zero at the end of a broadcast.

Bits 6 and 7: May be reserved for future use.

Throughout a day, the session counter maintains consecutive sequence numbers between the current and previous broadcast messages. The sequence number of the session counter changes to 1 when a new day (date) starts.

An example of the use of the sequencing mechanism is now described. Assume there were three broadcasts on June 25, and each broadcast was Mbytes long. Each broadcast required 2,000 FIB packets to be sent (excluding transmissions). At the beginning of the first broadcast, the message server started the sequence number at 1 and the date counter at 25 (or 11001 binary). The MORE bit was set to 1 in all packets of the broadcasts, except the last one. At the beginning of the second broadcast, the message server set the sequence number to start at 2,001. At the end of the second broadcast, the sequence number read 4,000. Similarly, the broadcast should have the sequence number start at 4,001 and end at 6,000. At midnight when the date changed to June 26, the sequence number was reset to 1 and the date counter was set to 26 (or 11010 binary).

With the above described exemplary sequencing mechanism, a broadcast may be divided so as to be transmitted in parts with sequence numbers. Yet, a wireless device receiving the broadcast may miss a part or more of the broadcast. Advantageously, the message server includes functionality to address the situation. The message server has the capability to request the wireless devices to report whether they have (within that date) received part(s) of a broadcast(s) with specific sequence numbers. A Fleet Control Broadcast (FCB) including a specific sequence number(s) can be sent to one or more wireless devices. Each FCB may be addressed to a maximum of sixty-eight wireless devices (as identified by manufacturer's serial number (MSN) and/or hardware serial number (HSN)). Instructions may be included in the FCB. Upon receipt and processing of the FCB, a wireless device may response with a Fleet Control Response (FCR). If the wireless device has not received the part(s) of the broadcast(s) with the referenced sequence number(s), then the message server may transmit the missing information or have it re-broadcast as appropriate.

Figure 4:
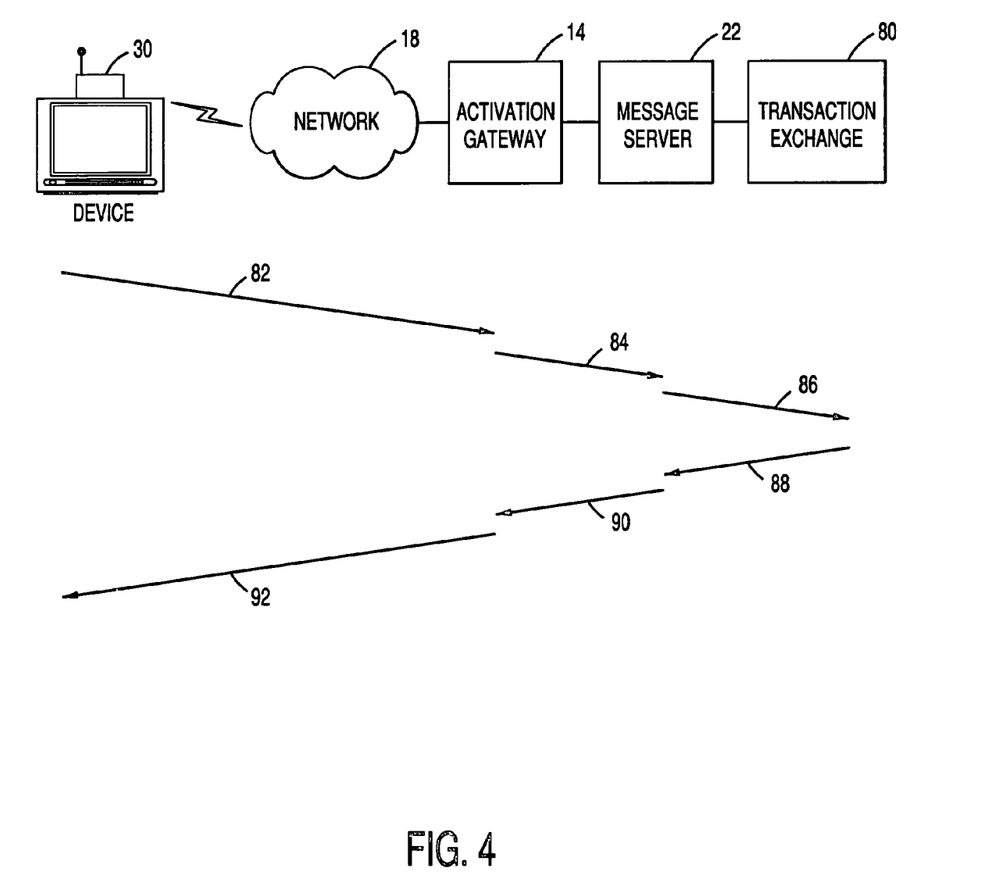
FIG. 4 illustrates an example of message flow during a transaction exchange initiated by a wireless device.
Figure 5:
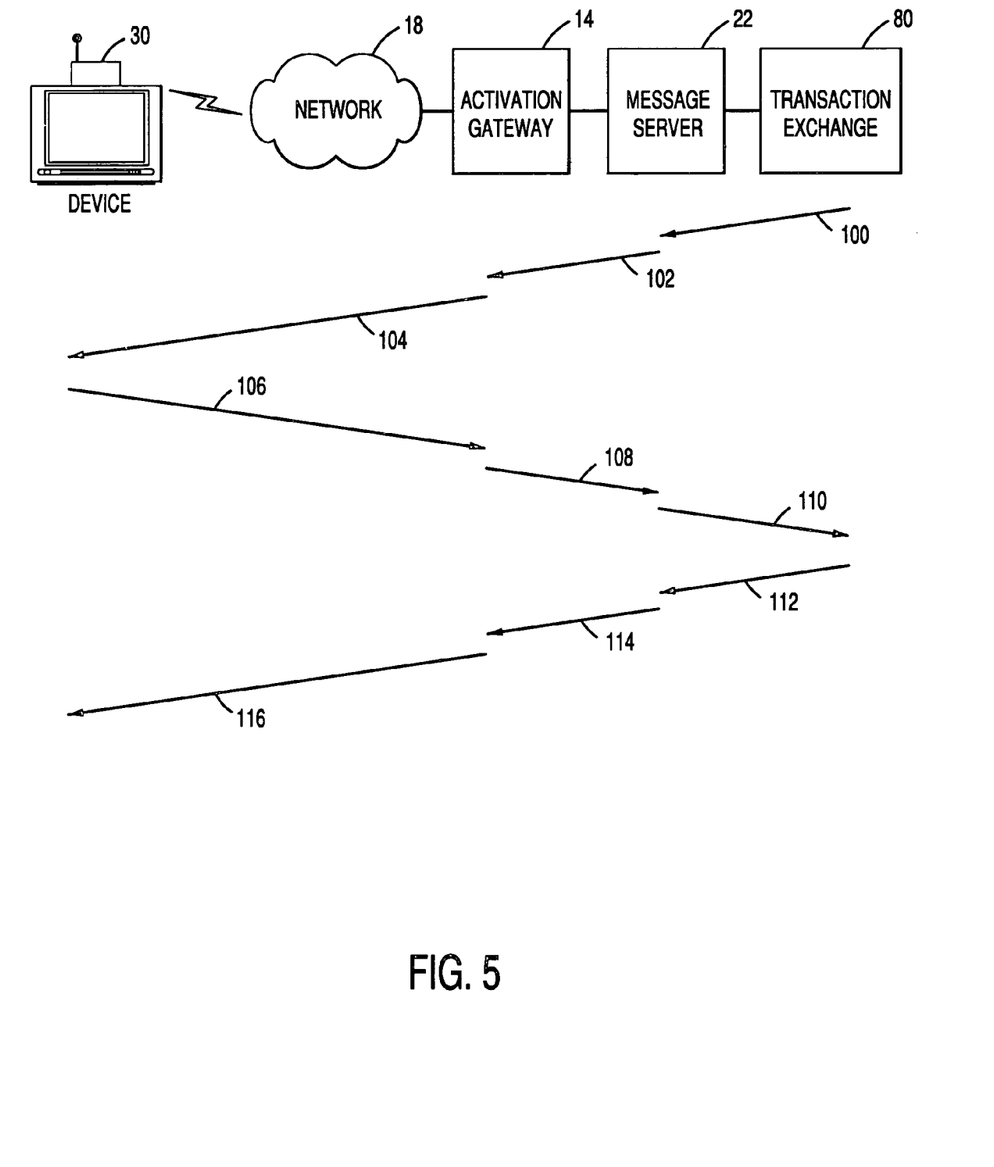
FIG. 5 illustrates an example of message flow during a transaction exchange initiated by a service provider.

Transaction Exchanges—FIGS. 4 and 5

Advantageously, the present inventions allow wireless units to make use of the broadcast functionality of the wireless network to engage in information exchanges, and particularly, to engage in transaction exchanges. In the course of these transaction exchanges, no unique network address (UNA) nor Mobitex access number (MAN) is assigned, but the generic access numbers may be made use of.

A transaction exchange also may be referred to as a transaction-oriented information exchange. Such an exchange may include:

Short inquiry services such as weather reports, stock quotes, sports scores, breaking news stories, joke-of-the-day, etc.

Wireless electronic commerce and on-line shopping

Short point-to-point messaging

FIG. 4 illustrates an example of message flow during a transaction exchange initiated by a wireless device. Assume for this example that the subscriber associated with the wireless device 30 desires to order some merchandise on-line. The subscriber uses the wireless device 30 to send an Activation Request containing specific information for the transaction. For example, the transaction information may include an indicator such as a control code that alerts elements of the wireless network that the information relates to a transaction. The transaction information also may include product number and credit card information. The transaction information may be contained in a field of the Activation Request such as the service provider information field. For a sender address associated with the Activation Request, a randomly generated GAN may be used.

As indicated by arrow 82, the Activation Request is transmitted from the wireless device 30 through the network 18 to an activation gateway 14. In response to receipt of the Activation Request, the activation gateway reconciles the appropriate information into an Authorization Request. As indicated by arrow 84, the activation gateway 14 transmits the Authorization Request to the message server 22. The message server 22 reformats the appropriate information into a Transaction Request.

As indicated by arrow 86, the message 22 sends the Transaction Request to a transaction exchange 80 (which may be a transaction exchange server or other appropriate element for conducting the transaction). The transaction exchange 80 may be accessed through the wireless network as indicated or otherwise. The transaction exchange 80 processes the transaction, which may be approved or denied. In some cases, additional information may be sought from the subscriber or information may simply be provided to the subscriber. After processing the transaction, the transaction exchange 80 creates a Transaction Response, which may include a specific response code to indicate the result of the transaction processing. In addition, the Transaction Response may include information related to the transaction exchange such as warranty, delivery, or other information or questions for the subscriber.

As indicated by arrow 88, the transaction exchange 80 transmits the Transaction Response to the message server 22, which reformats the appropriate information into an Authorization Denial that contains a "permanent denial".

As indicated by arrow 90, the message server 22 transmits the Authorization Denial to the activation gateway 14, which reformats the appropriate information into an Activation Response.

As indicated by arrow 92, the activation gateway 14 transmits the Activation Response through the network 18 to the wireless device 30. The Activation Response includes the randomly selected generic access number (GAN) initialized transmitted from the wireless device 30.

Advantageously, the inventions allow service providers to engage in transaction exchanges. An example of a transaction exchange a service provider may desire to engage is request for wireless devices (or their associated subscribers) to "call home", i.e., to contact the service provider.

FIG. 5 illustrates an example of message flow during a transaction exchange initiated by a service provider. To begin the exchange, the service provider may cause the transaction exchange 80 to create a Transaction Request including the appropriate information such as the manufacturer's serial number (MSN)/hardware serial number (HSN) of the addressed wireless devices. The Transaction Request may include other information such as instructions or requests made of the wireless devices or their subscribers.

As indicated by arrow 100, the transaction exchange 80 transmits the Transaction Request to the message server 22, which reformats the appropriate information into a Fleet Control Request (FCB).

As indicated by arrow 102, the message server 22 transmits the FCB to the activation gateway 14, which reformats the appropriate information into a Fleet Information Broadcast (FIB). The activation gateway 14, as indicated by action 14, transmits the FIB through the network 18 to the base stations serving the addressed wireless units.

As noted above in connection with FIG. 2, in some embodiments, the message server 14 may communicate directly with the wireless network without actions by the activation gateway. In this example illustrated in FIG. 5, if the activation gateway 14 is left out, then the message server 22 reformats the information in the Transaction Request received from the transaction exchange 80 into a FIB, and routes the FIB through the network 18 to the base stations.

The remainder of the actions associated with the transaction exchange initiated by the service provider parallel the actions in the transaction exchange initiated by the wireless device. Thus, the actions of arrows 106, 108, 110, 112, 114, and 116 in FIG. 5 compare respectively to actions 82, 84, 86, 88, 90, and 92 of FIG. 4 described above.

Session Exchanges

Advantageously, the inventions allow a wireless device to engage in session exchanges such as 2-way messaging and Web-based game playing. To engage in a session exchange, a wireless device must be assigned a unique access number (UAN). The present inventions allow a wireless device to be temporarily assigned a UAN.

To initiate the session exchange, a wireless device takes actions to obtain a UAN per the wireless subscription management (WSM) system or otherwise. Upon approval, a UAN is assigned to the wireless device, but only with a "time-to-live" allowance. When the time expires, the wireless device effectively is inactivated because the UAN is reclaimed by the activation gateway. Inactivation of the wireless device simply returns it to its broadcast mode. The wireless device cannot terminate the use of the UAN earlier than the "time-to-live" nor can the wireless device extend the "time-to-live". If the wireless device is to continue to engage in the session exchange, then the wireless device re-registers with the service provider or other entity, and applies for a new UAN.

With the UAN, even if it is limited by a "time-to-live" allowance, the wireless device may engage in a session exchange. While the wireless device is engaged in the session exchange through use of the UAN, the wireless device may continue to receive broadcasts addressed to a BAN of the wireless device because the BAN is used as one of the possible seven group access numbers (GANs) in the wireless device.

Figure 6A:
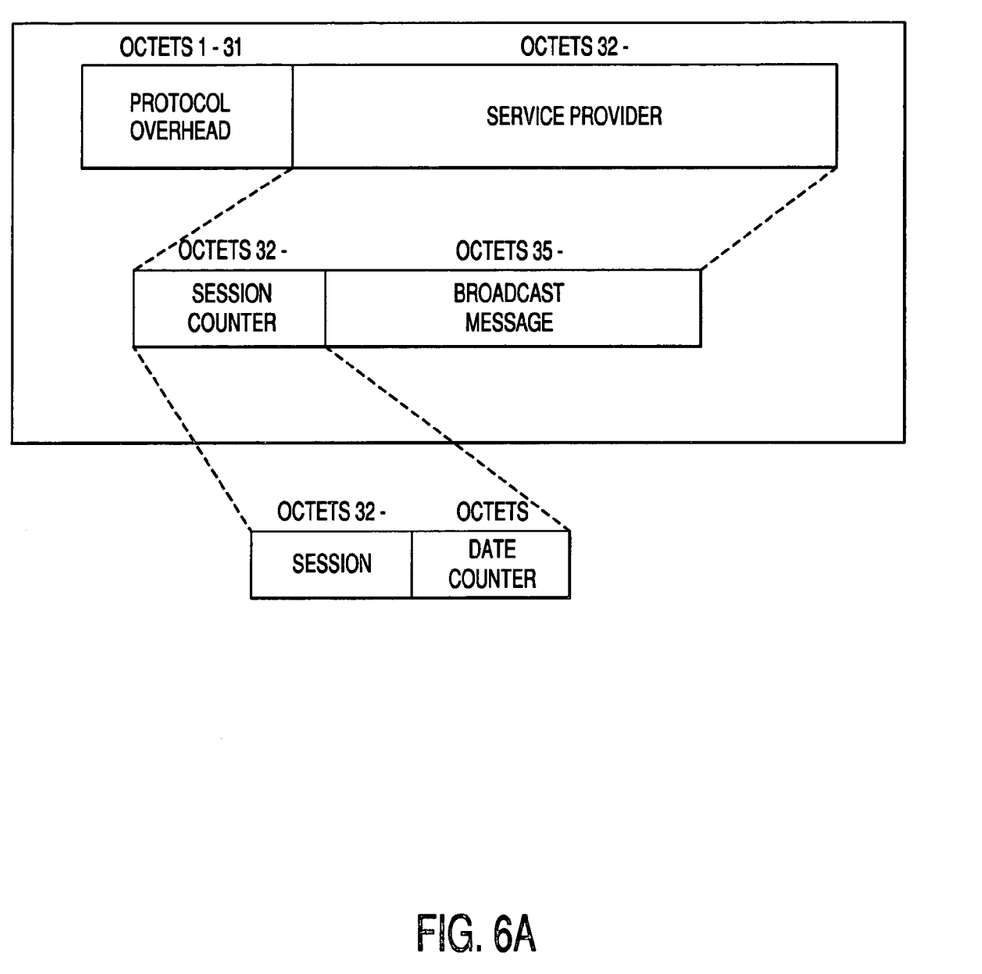
FIGS. 6A and 6B illustrate data packets as may be used in exemplary embodiments of the inventions.
Figure 6B:
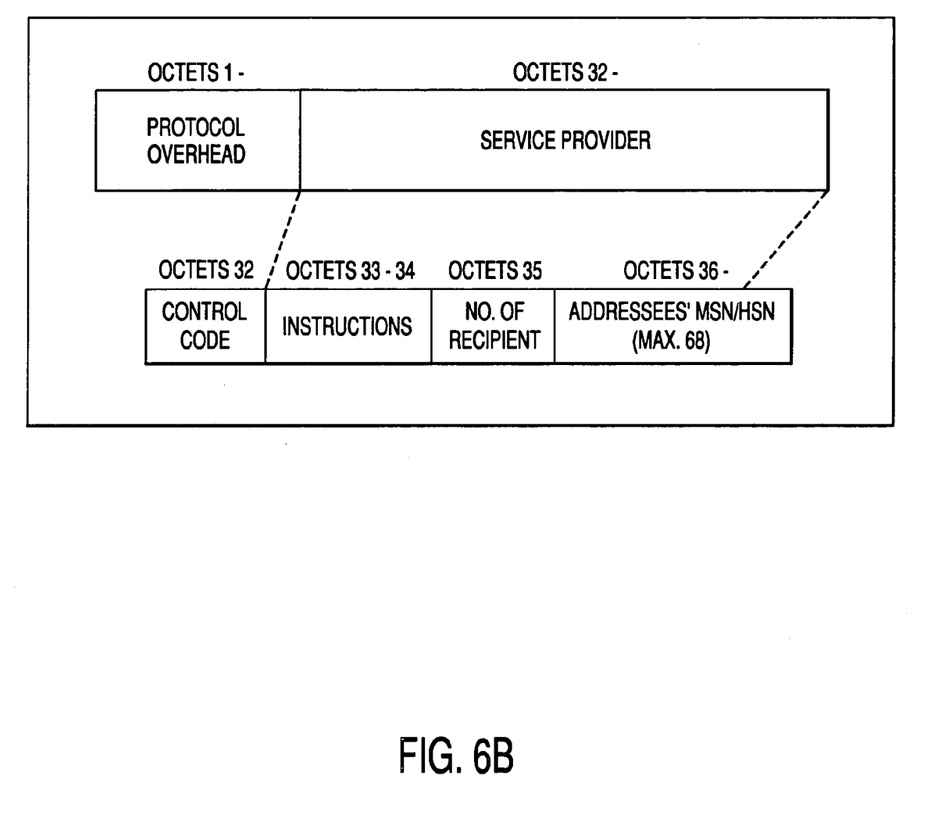

Exemplary Packet Formats for Broadcast Messages—FIGS. 6A and 6B

In the Mobitex network and in other wireless networks, data packet technology is used to transmit the messages between and among elements, and to ultimately delivery information to the appropriate destination. (Of course, other technology may be used to implement the inventions of this application.) The exemplary embodiments of the inventions described in this application implement a data packet format similar to that implemented in the wireless subscription management (WSM) system. As in the WSM system, the packets in the exemplary embodiments include protocol overhead for octets 1 to 31 and include data fields from octet 32.

The exemplary packets may include the following information in the protocol overhead octets 1 to 31:

Octets 1–11: Regular NPAK field. The sender address is the AN (or MAN) of the activation gateway, and the destination address is a BAN (or BMAN).

Octet 12: HPID. The HPID of 127 is used.

Octet 13: Packet type. For the FIB packet (explained below), this octet is set to 10 (ASCII number). For the FCB and FCR packets (also explained below), this octet is set to 11 and 12, respectively.

Octets 14–29: Network Routing Information. This information is to be provided by the message server based on the instructions from the scheduler.

Octets 30–31: Broadcast Protocol ID is set to 1.

FIGS. 6A and 6B illustrate exemplary packet formats used for some of the broadcasts (also referred to as messages or broadcast messages) described herein) such as the Fleet Information Broadcast (FIB), the Fleet Control Broadcast (FCB), and the Fleet Control Response (FCR). Of these three broadcasts, the FIB and the FCB are unidirectional from the message server and are broadcast to broadcast access numbers (BANs) on selected base stations. The third broadcast, the FCR, can only be sent in response to the FCB, and can only be sent from the wireless device to the message server.

The exemplary embodiments of the inventions described herein were chosen and described above in order to explain the principles of the inventions and their practical application so as to enable others skilled in the art to utilities the inventions including the various embodiments and various modifications as are suited to the particular use contemplated. The examples provided herein in the written description or in the drawings are not intended as limitations of the inventions. Other embodiments will suggest themselves to those skilled in the art. Therefore, the scope of the inventions is to be limited only by the claims below.

We claim:

1. A method for transmitting data to selected wireless devices in a wireless network without assignment of a unique network address, respectively, to each of the wireless devices, the method comprising:

provisioning a wireless device with at least a hardware serial number (HSN) and multiple generic access numbers (GANs);

registering with a service provider by randomly selecting a GAN and transmitting the GAN as well as the HSN to the service provider;

receiving at the wireless device a registration response comprising the randomly-selected generic access number (GAN) and multiple identifications of multiple radio channels;

switching at the wireless device to each radio channel and measuring a signal strength of each radio channel;

sending from the wireless device a final request including the signal strength of each radio channel;

receiving a broadcast access number (BAN) and an identification of a radio channel at the wireless device;

receiving a broadcast over the radio channel with the broadcast including data directed to the wireless device and associated with the BAN; and causing the wireless device to use the identification of the radio channel to monitor the radio channel and to use the BAN to access the data directed to the wireless device and associated with the BAN from the broadcast made over the radio channel.

2. The method of claim 1, further comprising:

receiving the BAN and the identification of the radio channel at another wireless device having information needs in common with the wireless device; and causing the another wireless device to use the identification of the radio channel to monitor the radio channel and to use the BAN to access the data broadcast over the radio channel.

3. The method of claim 1, further comprising:

in response to accessing the data, causing the wireless device to determine whether the data comprises a broadcast message by inspecting a structure of the data for a zero value in a data field for the HSN, indicating the broadcast message.

4. The method of claim 3, wherein the wireless device determines the data comprises the broadcast message by determining the data comprises a serial number field containing zero.

5. The method of claim 1, further comprising:

in response to accessing the data, causing the wireless device to determine whether the data comprises a point-to-point message for the wireless device.

6. The method of claim 5, wherein the wireless device comprises a serial number; and wherein the wireless device determines the data comprises the point-to-point message by determining the data comprises a serial number field matching the serial number of the wireless device.

7. The method of claim 5, wherein the wireless device comprises a serial number; and wherein the wireless device determines the data does not comprise the point-to-point message by determining the data comprises a non-zero serial number field that fails to match the serial number of the wireless device.

8. A method for a transaction exchange between a wireless device in a wireless system and a service provider without assignment of a unique network address to the wireless device, the method comprising:

sending a registration request from the wireless device, the registration request comprising a hardware serial number (HSN) and a randomly-selected generic access number (GAN) from multiple generic access numbers (GANs);

receiving a registration response comprising the randomly-selected generic access number (GAN) and multiple identifications of multiple radio channels, the wireless device switching to each radio channel and measuring a signal strength of each radio channel, the wireless device then sending a final request including the signal strength of each radio channel;

receiving a broadcast access number (BAN) and an identification of a radio channel, the wireless device monitoring broadcasts on the radio channel and using the BAN to retrieve information associated with the BAN from the broadcasts;

receiving a transaction request, the transaction request including transaction information and an identifier of the wireless device;

in response to receiving the transaction request, causing the transaction information to be associated with the BAN and to be included in a broadcast on the radio channel;

in response to the broadcast, receiving an activation request from the wireless device, the activation request including responsive transaction information;

in response to the activation request including the responsive transaction information, causing the responsive transaction information to be routed to the service provider;

in response to the routing of the responsive transaction information to the service provider, receiving a transaction response from the service provider; and associating the transaction response with the BAN and making a responsive broadcast of the transaction response with the BAN over the radio channel so that the wireless device retrieves the transaction response using the BAN from the responsive broadcast on the radio channel; and whereby the transaction exchange takes place between the wireless device and the service provider by the transaction information being associated with the BAN and broadcast over the radio channel so the wireless device uses the BAN to retrieve the transaction information from the broadcast on the radio channel so that no unique network address is assigned to the wireless device.

* * * * *